US012657943B2

(12) United States Patent
Thomas et al.

(10) Patent No.: US 12,657,943 B2
(45) Date of Patent: Jun. 16, 2026

(54) METHOD AND SYSTEM FOR EXTRACTING INFORMATION FROM DOCUMENTS VIA EYE GAZE TRACKING

(71) Applicant: JPMorgan Chase Bank, N.A., New York, NY (US)

(72) Inventors: Nancy Thomas, New York, NY (US); Daniel Borrajo, Pozuelo de Alarcon (ES)

(73) Assignee: JPMORGAN CHASE BANK, N.A., New York, NY (US)

( * ) Notice: Subject to any disclaimer, the term of this patent is extended or adjusted under 35 U.S.C. 154(b) by 634 days.

(21) Appl. No.: 18/118,520

(22) Filed: Mar. 7, 2023

(65) Prior Publication Data

US 2024/0304012 A1     Sep. 12, 2024

(51) Int. Cl.
| | |
|---|---|
| *G06V 30/14* | (2022.01) |
| *G06F 3/01* | (2006.01) |
| *G06V 30/146* | (2022.01) |
| *G06V 30/148* | (2022.01) |
| *G06V 30/414* | (2022.01) |

(52) U.S. Cl.
CPC .......... *G06V 30/1456* (2022.01); *G06F 3/013* (2013.01); *G06V 30/1452* (2022.01); *G06V*

*30/147* (2022.01); *G06V 30/15* (2022.01); *G06V 30/414* (2022.01)

(58) Field of Classification Search
None
See application file for complete search history.

(56) References Cited

U.S. PATENT DOCUMENTS

2021/0020159 A1* 1/2021 Tran ........................ G10L 13/00

* cited by examiner

*Primary Examiner* — Andrew H Lam
(74) *Attorney, Agent, or Firm* — Greenblum & Bernstein, P.L.C.

(57) ABSTRACT

A method and system for using eye gaze tracking to extract information in textual form from documents is provided. The method includes: receiving an image that corresponds to a document; receiving, from an eye-tracking sensor configured to detect a sequence of eye-gaze positions on the document as a function of time, a sequence of measurements that correspond to a human reading of the document; determining, based on the received sequence of measurements, a region of the document that is being read by a human; and extracting the textual information that corresponds to the region.

13 Claims, 5 Drawing Sheets

100

102

100

102

400

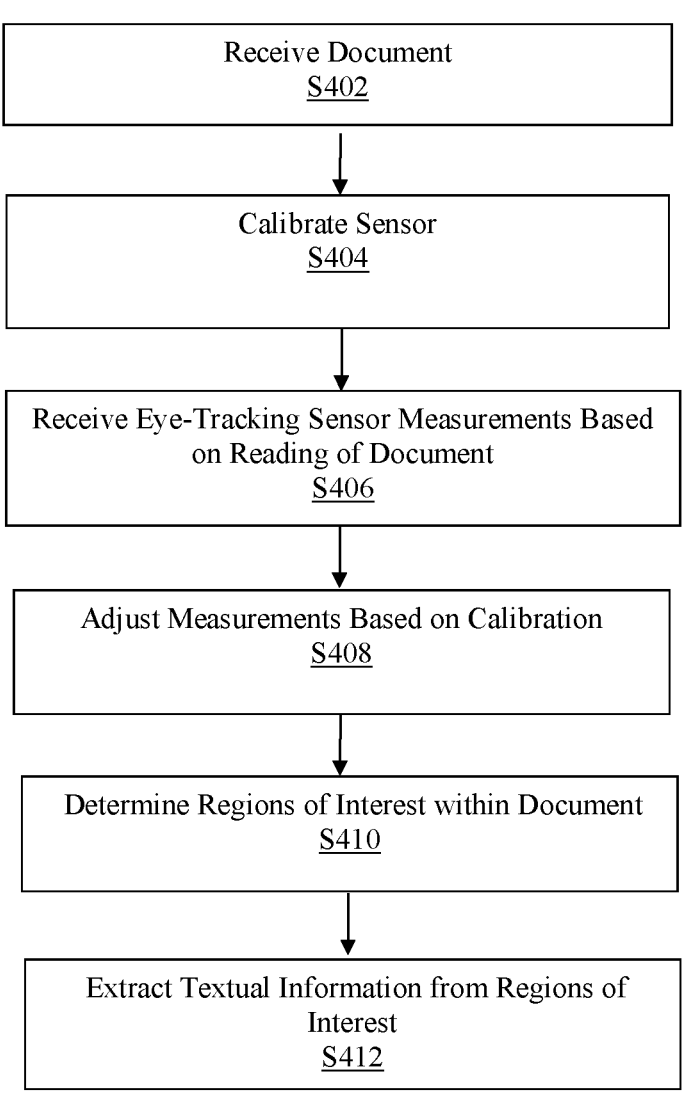

```
┌─────────────────────────────────────┐
│         Receive Document            │
│              S402                   │
└─────────────────────────────────────┘
                 │
                 ▼
┌─────────────────────────────────────┐
│         Calibrate Sensor            │
│              S404                   │
└─────────────────────────────────────┘
                 │
                 ▼
┌─────────────────────────────────────┐
│ Receive Eye-Tracking Sensor         │
│ Measurements Based on Reading of    │
│ Document                            │
│              S406                   │
└─────────────────────────────────────┘
                 │
                 ▼
┌─────────────────────────────────────┐
│ Adjust Measurements Based on        │
│ Calibration                         │
│              S408                   │
└─────────────────────────────────────┘
                 │
                 ▼
┌─────────────────────────────────────┐
│ Determine Regions of Interest       │
│ within Document                     │
│              S410                   │
└─────────────────────────────────────┘
                 │
                 ▼
┌─────────────────────────────────────┐
│ Extract Textual Information from     │
│ Regions of Interest                 │
│              S412                   │
└─────────────────────────────────────┘
```

Separation of fixations and saccades

Adjust for calibration error

Estimate time at which answer is found

Bounding box detection on words

Merge bounding boxes and Naïve Bayes Classifier

Predicted text

Post-processing

Cleaned predicted text

500

METHOD AND SYSTEM FOR EXTRACTING INFORMATION FROM DOCUMENTS VIA EYE GAZE TRACKING

BACKGROUND

1. Field of the Disclosure

This technology generally relates to methods and systems for extracting information from documents, and more particularly, to methods and systems for using eye gaze tracking to extract information in textual form from documents.

2. Background Information

Eye gaze tracking uses technology to measure the position of a person's gaze, which can be used for a variety of purposes such as enabling gaze controlled computer cursors or gaining an understanding of human thinking and decision making. Eye trackers measure gaze position by shining infrared light into the eye, thereby creating reflections off the cornea. These reflection vectors are measured relative to the pupil to determine where the person is looking. Eye gaze tracking has been employed in numerous fields including psychology, linguistics, and marketing. It has also been used to support machine learning models in natural language processing.

There are many works in the area of information extraction, most utilizing Natural Language Processing (NLP) and some utilizing eye gaze tracking. There are also many works which explore the use of eye gaze tracking to achieve other goals.

NLP based information extraction can be successful in extracting all examples of a piece of information in a document. However, there is a shortfall in a situation where it is desired to extract one particular instance of such information from the document. For example, suppose that it is desired to extract the most recent place of employment from a resume. Standard NLP based information extraction algorithms would likely extract all instances of places of employment, but would struggle to identify the most recent. This would require knowledge about the ordering of items on the document or additional methods to help identify which place of employment meets the criteria of most recent. The human, on the other hand, can easily identify which place of employment is the desired one, and can guide the system through their gaze to extract only this information.

In addition to its use for information extraction, eye gaze tracking can also be used to assist with part of speech tagging, sentiment analysis, named entity recognition, and sequence labeling as well as psychology related tasks such as understanding reading patterns, analyzing eye contact during conversations, and studying implicit bias.

Accordingly, there is a need for a method and system for using eye gaze tracking to extract information in textual form from documents.

SUMMARY

The present disclosure, through one or more of its various aspects, embodiments, and/or specific features or sub-components, provides, inter alia, various systems, servers, devices, methods, media, programs, and platforms for using eye gaze tracking to extract information in textual form from documents.

According to an aspect of the present disclosure, a method for using eye gaze tracking to extract information in textual form from documents is provided. The method is implemented by at least one processor. The method includes: receiving, by the at least one processor, an image that corresponds to a document; receiving, by the at least one processor from a sensor, a sequence of measurements that correspond to a reading of the document by a human; determining, by the at least one processor based on the received sequence of measurements, at least one region of the document that is being read by the human; and extracting, by the at least one processor, the textual information that corresponds to the determined at least one region.

The sensor may include an eye-tracking sensor configured to detect a sequence of eye-gaze positions on the document as a function of time.

The method may further include using the sequence of measurements to identify at least one fixation and at least one saccade.

The method may further include: during the receiving of the sequence of measurements, collecting a predetermined number of calibration measurements that correspond to predetermined locations within the document. The determining of the at least one region that is being read by the human may include adjusting the received sequence of measurements based on the collected calibration measurements.

The at least one region may include a first region that corresponds to an answer for which the human searches while reading the document. The method may further include using the received sequence of measurements to estimate a time at which the answer is found by the human.

The method may further include: drawing, for each textual unit included in the document, a respective box that surrounds the corresponding textual unit, in order to generate a plurality of boxes; determining, based on a predetermined set of criteria, whether at least a first box from among the plurality of boxes is to be merged with at least one additional box from among the plurality of boxes; and merging at least a subset of the plurality of boxes into a plurality of box groups based on a result of the determining with respect to the plurality of boxes.

The determining of the at least one region may include selecting at least one box group from among the plurality of box groups as corresponding to the at least one region.

The determining of the at least one region may include calculating a probability that a first subset of the sequence of measurements corresponds to the at least one box group.

The method may further include calculating a probability that a first question from among a predetermined plurality of questions corresponds to the extracted textual information.

According to another aspect of the present disclosure, a computing apparatus for extracting textual information from a document is provided. The computing apparatus includes a processor, a memory, and a communication interface coupled to each of the processor and the memory. The processor is configured to: receive, via the communication interface, an image that corresponds to a document; receive, via the communication interface from a sensor, a sequence of measurements that correspond to a reading of the document by a human; determine, based on the received sequence of measurements, at least one region of the document that is being read by the human; and extract the textual information that corresponds to the determined at least one region.

The sensor may include an eye-tracking sensor configured to detect a sequence of eye-gaze positions on the document as a function of time.

The processor may be further configured to use the sequence of measurements to identify at least one fixation and at least one saccade.

The processor may be further configured to: during the reception of the sequence of measurements, collect a predetermined number of calibration measurements that correspond to predetermined locations within the document; and, while performing the determination of the at least one region that is being read by the human, adjust the received sequence of measurements based on the collected calibration measurements.

The at least one region may include a first region that corresponds to an answer for which the human searches while reading the document. The processor may be further configured to use the received sequence of measurements to estimate a time at which the answer is found by the human.

The processor may be further configured to: draw, for each textual unit included in the document, a respective box that surrounds the corresponding textual unit, in order to generate a plurality of boxes; determine, based on a predetermined set of criteria, whether at least a first box from among the plurality of boxes is to be merged with at least one additional box from among the plurality of boxes; and merge at least a subset of the plurality of boxes into a plurality of box groups based on a result of the determination with respect to the plurality of boxes.

The processor may be further configured to select at least one box group from among the plurality of box groups as corresponding to the at least one region.

The processor may be further configured to calculate a probability that a first subset of the sequence of measurements corresponds to the at least one box group.

The processor may be further configured to calculate a probability that a first question from among a predetermined plurality of questions corresponds to the extracted textual information.

According to yet another exemplary embodiment, a non-transitory computer readable storage medium storing instructions for extracting textual information from a document is provided. The storage medium includes executable code which, when executed by a processor, causes the processor to: receive an image that corresponds to a document; receive, from a sensor, a sequence of measurements that correspond to a reading of the document by a human; determine, based on the received sequence of measurements, at least one region of the document that is being read by the human; and extract the textual information that corresponds to the determined at least one region.

The sensor may include an eye-tracking sensor configured to detect a sequence of eye-gaze positions on the document as a function of time.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for using eye gaze tracking to extract information in textual form from documents.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
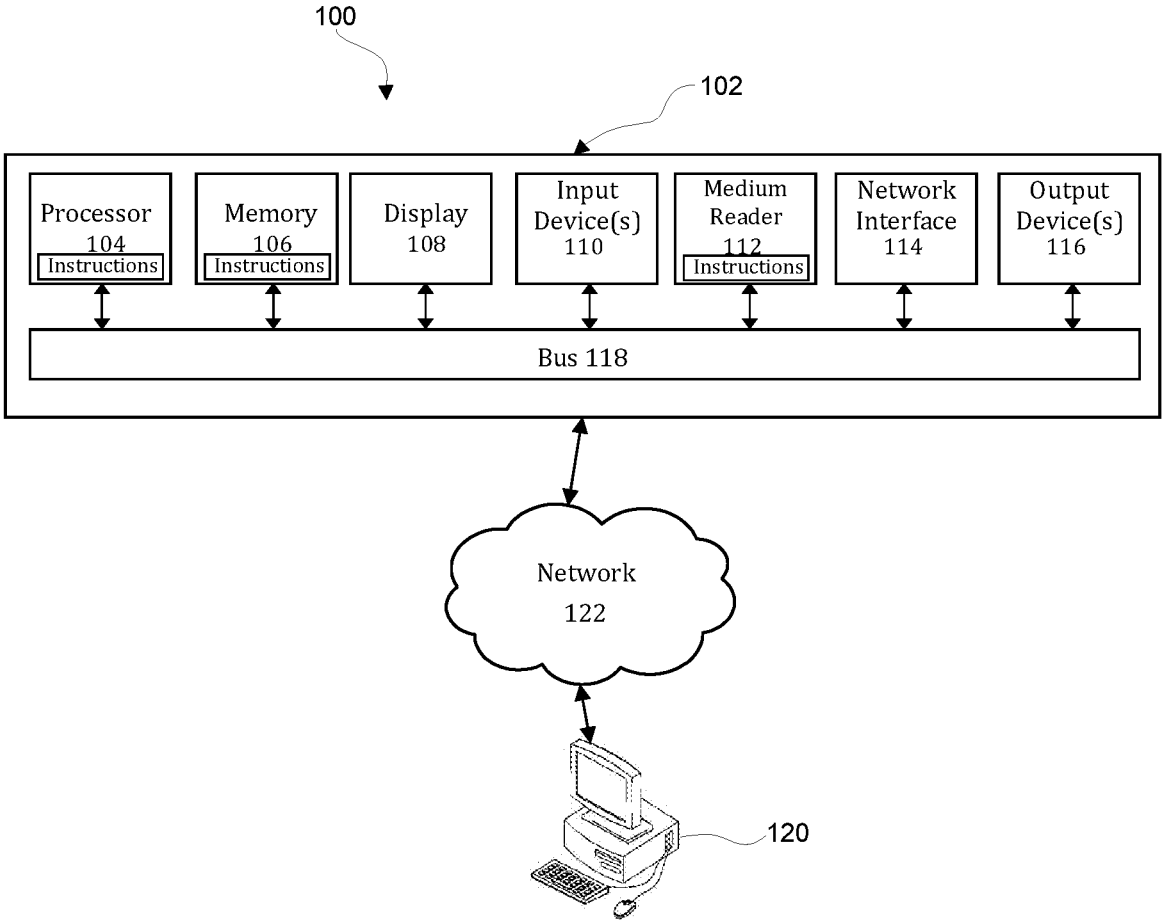
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using eye gaze tracking to extract information in textual form from documents.

Figure 2:
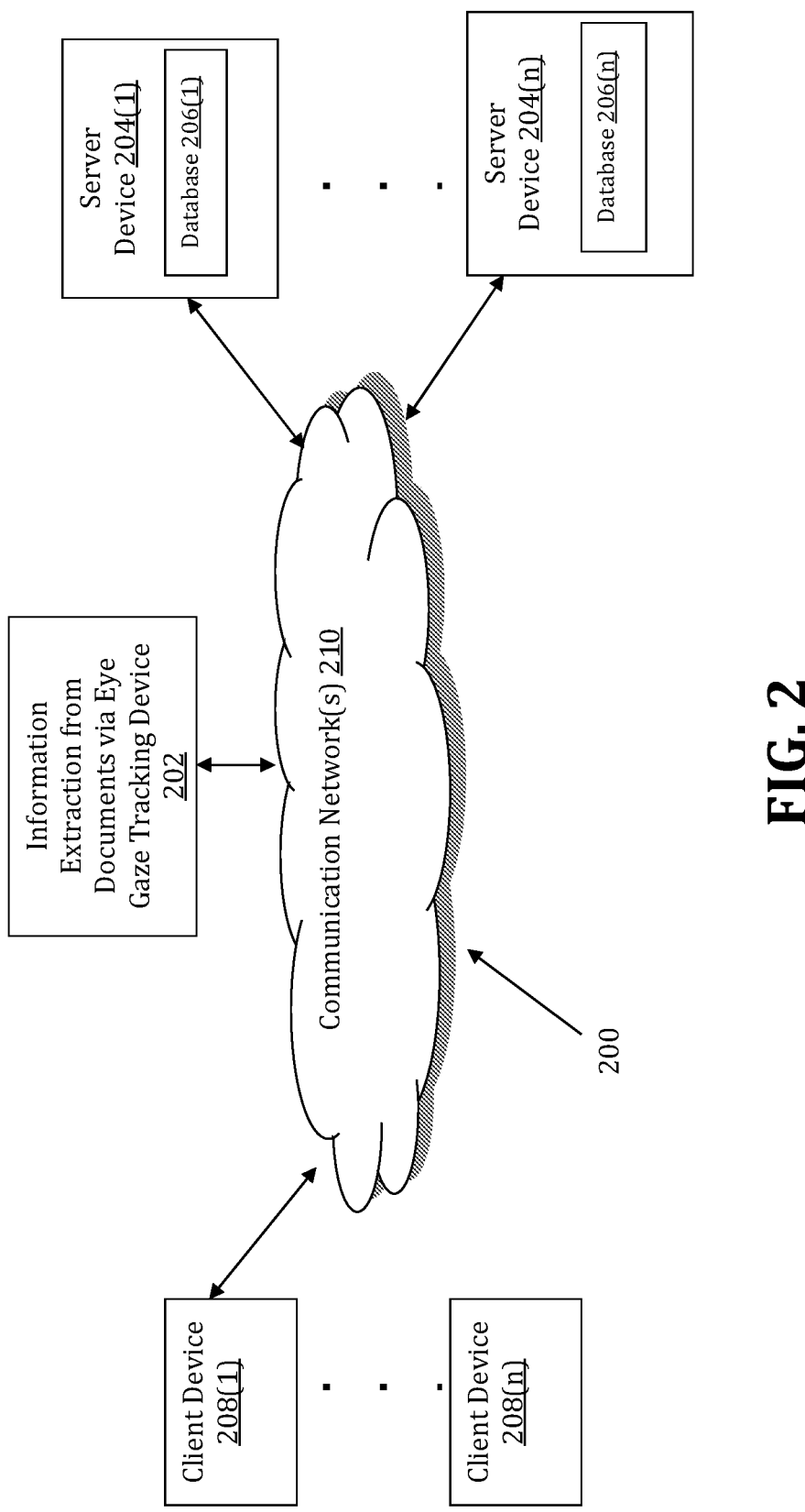
FIG. 2 illustrates an exemplary diagram of a network environment.

Referring to FIG. 2, a schematic of an exemplary network environment 200 for implementing a method for using eye gaze tracking to extract information in textual form from documents is illustrated. In an exemplary embodiment, the method is executable on any networked computer platform, such as, for example, a personal computer (PC).

The method for using eye gaze tracking to extract information in textual form from documents may be implemented by an Information Extraction from Documents via Eye Gaze Tracking (IEDEGT) device 202. The IEDEGT device 202 may be the same or similar to the computer system 102 as described with respect to FIG. 1. The IEDEGT device 202 may store one or more applications that can include executable instructions that, when executed by the IEDEGT device 202, cause the IEDEGT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IEDEGT device 202 itself, may be located in virtual server(s) running in a cloud-based computing environment rather than being tied to one or more specific physical network computing devices. Also, the application(s) may be running in one or more virtual machines (VMs) executing on the IEDEGT device 202. Additionally, in one or more embodiments of this technology, virtual machine(s) running on the IEDEGT device 202 may be managed or supervised by a hypervisor.

In the network environment 200 of FIG. 2, the IEDEGT device 202 is coupled to a plurality of server devices 204(1)-204(n) that hosts a plurality of databases 206(1)-206(n), and also to a plurality of client devices 208(1)-208(n) via communication network(s) 210. A communication interface of the IEDEGT device 202, such as the network interface 114 of the computer system 102 of FIG. 1, operatively couples and communicates between the IEDEGT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IEDEGT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and IEDEGT devices that efficiently implement a method for using eye gaze tracking to extract information in textual form from documents.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IEDEGT device 202 may be a standalone device or integrated with one or more other devices or apparatuses, such as one or more of the server devices 204(1)-204(n), for example. In one particular example, the IEDEGT device 202 may include or be hosted by one of the server devices 204(1)-204(n), and other arrangements are also possible. Moreover, one or more of the devices of the IEDEGT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IEDEGT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store documents, document-specific data, and eye-tracking sensor data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the IEDEGT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the IEDEGT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the IEDEGT device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IEDEGT device 202, the server devices 204(1)-204(n), or the client devices 208(1)-208(n), for example, may be configured to operate as virtual instances on the same physical machine. In other words, one or more of the IEDEGT device 202, the server devices 204(1)-204(n), or the client devices 208(1)-208(n) may operate on the same physical device rather than as separate devices communicating through communication network(s) 210. Additionally, there may be more or fewer IEDEGT devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
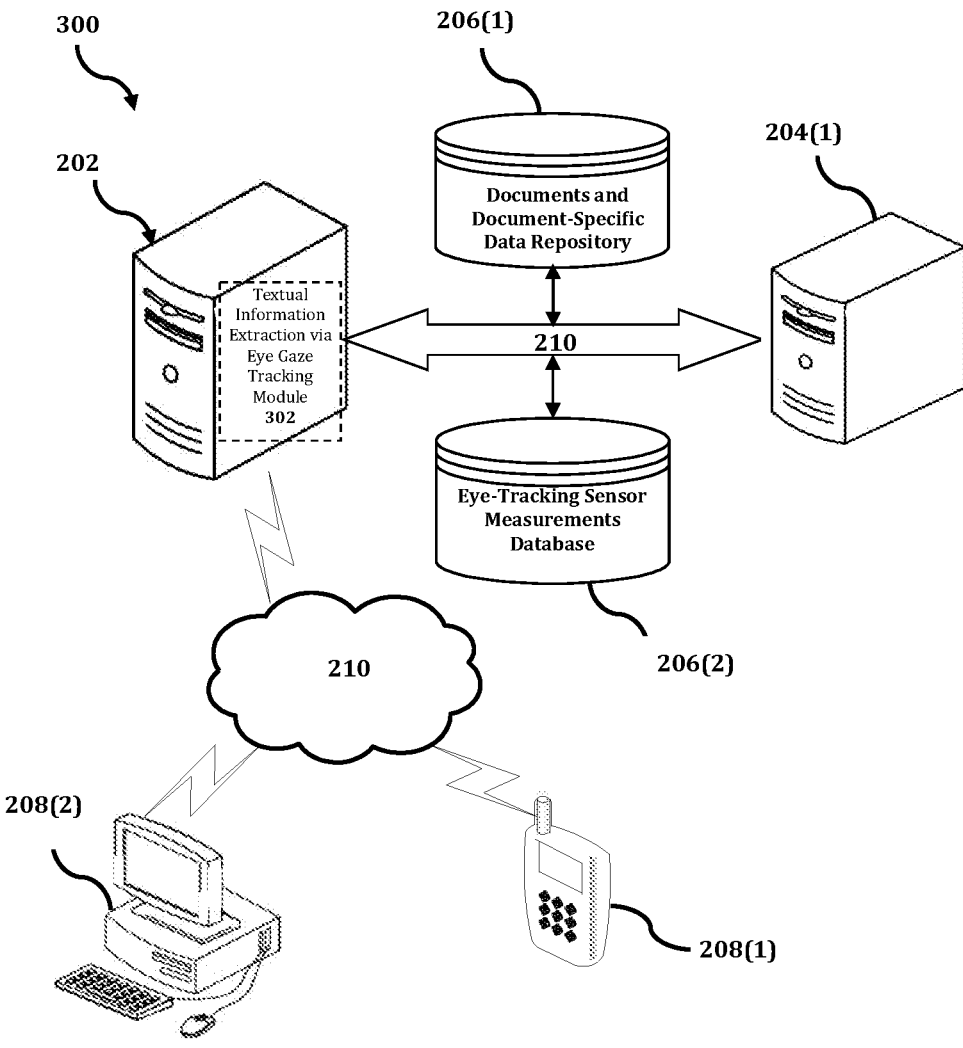
FIG. 3 shows an exemplary system for implementing a method for using eye gaze tracking to extract information in textual form from documents.

The IEDEGT device 202 is described and shown in FIG. 3 as including an textual information extraction via eye gaze tracking module 302, although it may include other rules, policies, modules, databases, or applications, for example. As will be described below, the textual information extraction via eye gaze tracking module 302 is configured to implement a method for using eye gaze tracking to extract information in textual form from documents in an automated, efficient, scalable, and reliable manner.

An exemplary process 300 for implementing a method for using eye gaze tracking to extract information in textual form from documents by utilizing the network environment of FIG. 2 is shown as being executed in FIG. 3. Specifically, a first client device 208(1) and a second client device 208(2) are illustrated as being in communication with IEDEGT device 202. In this regard, the first client device 208(1) and the second client device 208(2) may be "clients" of the IEDEGT device 202 and are described herein as such. Nevertheless, it is to be known and understood that the first client device 208(1) and/or the second client device 208(2) need not necessarily be "clients" of the IEDEGT device 202, or any entity described in association therewith herein. Any additional or alternative relationship may exist between either or both of the first client device 208(1) and the second client device 208(2) and the IEDEGT device 202, or no relationship may exist.

Further, IEDEGT device 202 is illustrated as being able to access a documents and document-specific data repository 206(1) and an eye-tracking sensor measurements database 206(2). The textual information extraction via eye gaze tracking module 302 may be configured to access these databases for implementing a method for using eye gaze tracking to extract information in textual form from documents.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the IEDEGT device 202 via broadband or cellular communication. Of course, these embodiments are merely exemplary and are not limiting or exhaustive.

Upon being started, the textual information extraction via eye gaze tracking module 302 executes a process for using eye gaze tracking to extract information in textual form from documents. An exemplary process for using eye gaze tracking to extract information in textual form from documents is generally indicated at flowchart 400 in FIG. 4.

In the process 400 of FIG. 4, at step S402, the textual information extraction via eye gaze tracking module 302 receives a document. In an exemplary embodiment, the document may be received in the form of an image that corresponds to the document, and the image may include any one of a physical page that corresponds to the document and a digital file that corresponds to the document.

At step S404, the textual information extraction via eye gaze tracking module 302 calibrates a sensor by collecting calibration measurements that correspond to predetermined locations within the document. In an exemplary embodiment, the sensor includes at least one eye-tracking sensor that is configured to detect a sequence of eye-gaze positions on the document as a function of time. The calibration measurements may be used to compare the eye-gaze positions with the known actual locations to determine any errors or offsets that may be occurring.

At step S406, the textual information extraction via eye gaze tracking module 302 receives, from the sensor, a sequence of measurements that correspond to a reading of the document by a human. In an exemplary embodiment, the sequence of measurements may be used to identify one or more fixations and one or more saccades. Then, at step S408, the textual information extraction via eye gaze tracking module 302 uses the errors and/or offsets observed in performing the calibration measurements to adjust the measurements received in step S406.

At step S410, the textual information extraction via eye gaze tracking module 302 determines at least one region of the document that is being read by the human (also referred to herein as a "region of interest"). In an exemplary embodiment, the textual information extraction via eye gaze tracking module 302 draws a set of boxes that surround each of a plurality of textual units, such as, for example, words, within the document, and then uses a predetermined set of criteria to merge certain boxes together in order to form box groups. The region of interest may then correspond to one or more of the box groups. The predetermined set of criteria may include criteria relating to proximity between respective boxes. For example, if there are four boxes that are located directly next to each other and/or directly above or below each other, and there are no other boxes that are located within a similar proximity to the four boxes, then a determination may be made to merge the four boxes into a single box group.

In an exemplary embodiment, the determination of the region(s) of interest may include calculating a probability that a particular subset of the measurements received in step S406 correspond to a particular bounding box and/or to a particular box group.

In an exemplary embodiment, the textual information extraction via eye gaze tracking module 302 may use the fixations and the saccades to determine which portions of the document correspond to regions of interest. For example, if there is a fixation at a particular portion of the document, then a determination may be made that that particular portion of the document corresponds to a region of interest.

In an exemplary embodiment, it may be known that a human is searching for an answer to a question by reading the document. In this scenario, the human may tend to fixate upon the answer when the answer is found, and the received sequence of measurements may be used to estimate a time at which the answer is found.

At step S412, the textual information extraction via eye gaze tracking module 302 extracts textual information from each region of interest as determined in step S410. In an exemplary embodiment, when a particular region of interest corresponds to a box group that includes a merged group of four boxes that each individually surround a single word, the four words included in that box group are then extracted. In an exemplary embodiment, when textual information is extracted, a calculation may be made of a probability that the extracted textual information corresponds to a particular question from among a predetermined set of questions. For example, in a scenario for which it is know or presumed that a reader of the document is interested in researching or investigating one or more questions from among a predetermined set of questions, the extracted textual information may include words that correlate with a particular question.

In an exemplary embodiment, a goal is to use eye tracking technology to perform automatic text extraction. Experiments are performed in which a subject is to locate some information within a document and then focus their gaze on it for some time. Using just the data collected from the experiment as well as the question for which the subject was asked to find the answer, the objective is to extract the relevant information in textual form.

In an exemplary embodiment, this goal can be split into two main sub-goals. The first sub-goal is to determine where on the document the subject is looking. The second sub-goal is to extract the underlying text. First, types of eye movement that are not associated with information collection are identified and removed. Then, an adjustment is made for the inability of the eye gaze tracker to perfectly capture where someone is looking by leveraging the calibration results to shift the observed gaze points. Then, an Optical Character Recognition (OCR) model is applied to the document to identify text and its corresponding bounding box in the document. Next, gaze patterns are used to estimate when the person has located the answer, and only data from this point onward is used. In another important step, a Naive Bayes Classifier is leveraged to identify which bounding box of information the person is looking at. Finally, post-processing operations are performed on the selected answer.

Clustering based methods: One approach to the task of information extraction via eye gaze tracking is to use density-based clustering methods to identify areas of focus based on a person's gaze patterns. Here, only the coordinates of a person's gaze on the screen are considered; these coordinates correspond directly to coordinates on the displayed document. These coordinates are then grouped into clusters, and it is assumed that the cluster with the greatest number of points corresponds to the area in which the answer is contained in the document. This is a fair assumption because gaze points are collected at regular time intervals (i.e., about every 16 milliseconds), so the cluster with the greatest number of points represents the area the person focused on for the longest amount of time. This area is more likely to contain the answer which the subject was searching for. Finally, the document is cropped to the area spanned by this cluster, and an OCR algorithm is applied to obtain the resulting text.

The primary challenge with this method lies in the fact that the clusters tend to sprawl and even the most dense cluster tends to occupy a relatively large area of the document. Further, the process of identifying which text within that area is the true answer is difficult.

Segmentation and counting gaze points: A second approach is to segment the document into bounding boxes containing textual units consisting of one or a few words, count how many gaze points fall inside each segment, and take the segmented units with the greatest number of gaze points. Here, the same assumption is made that areas with a high number of gaze points are the areas which contain the answer. By segmenting the document into bounding boxes containing small textual units, an attempt is made to tackle the problem of over capturing encountered with the clustering based method.

The predicted answer corresponds to the text contained in the bounding box with the highest number of gaze points occurring within it. In order to get the text from the bounding box, an open source OCR algorithm is applied.

The primary shortcoming of this approach is that the device is not very precise at the word level and the observed gaze points often do not match where the person was actually looking, even when an adjustment is made for calibration errors. Thus, it is often the case that the textual units with the highest number of gaze points fall one line above or below the true answer. This is evident in the low accuracy when looking only at the bounding box with the single highest number of gaze points versus looking at the top three bounding boxes by number of gaze points. This prompts an exploration of methods which treat the observed gaze points probabilistically.

This also prompts an effort to understand more precisely the degree of noise in the device. In order to quantify this, an extraction of all gaze points occurring after the subject had indicated that they had found the answer is made, and then a calculation of the distance between these points and the ground truth bounding box is performed. In theory, if the device is well calibrated and accurate and the subject is following the instructions of the task, this distance should be very small, because during this period, the subject should be looking directly at the answer. A measurement is then made of the average distance between this subset of gaze points and the center of the ground truth bounding box and the nearest edge or corner of the bounding box.

Estimating when answer is found and using coordinates at this time: Another approach is to use gaze patterns to estimate when the subject had located the answer and to use only the coordinates at that time to extract the answer. In other words, the same segmentation into bounding boxes as described above is used, and the selected answer is considered as corresponding to the text inside the bounding box in which the gaze point at that time step was located.

To identify when the person has found the answer, observed patterns in a person's gaze when searching for a piece of information are leveraged. Intuitively, one might think that once a person has found the information they are looking for in a document, the variation in the coordinates of their gaze would decrease sharply. In other words, they would begin to focus only on a small section of the document, without moving their eyes too far from this area. This hypothesis has been tested and found to be correct.

This pattern is used to design a strategy to pinpoint when the person has found the answer. In particular, a threshold Tis set, and the time at which the answer was found is considered as being the first time at which the variation in a person's gaze dropped below T and stayed there for the next N time steps.

After determining the time at which the answer was first located, the corresponding coordinates at that time are extracted, and the predicted answer is deemed as being the text corresponding to the bounding box in which this gaze point falls.

The primary problem with this approach is that there is a lot of noise associated with a single gaze point. Even when the identification of the time at which the person located the answer and was gazing at it is correct, it is possible that the observed gaze point at this time does not occur inside the true bounding box due to noise in the device. Therefore, additional points may be included and consideration may be given to their location in terms of a probability distribution to help remedy this issue.

Figure 5:
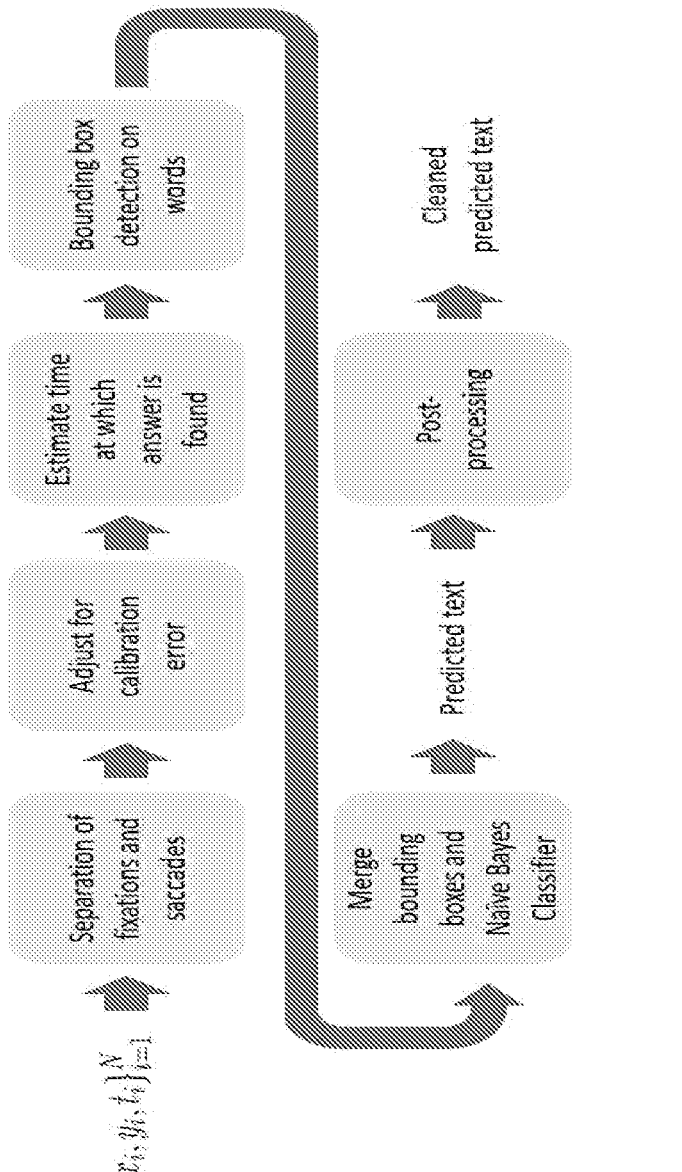
FIG. 5 is a flow diagram that illustrates various steps of a method for using eye gaze tracking to extract information in textual form from documents, according to an exemplary embodiment.

In an exemplary embodiment, another approach divides the problem into two primary tasks: identifying where on the screen the participant is looking and extracting the answer in textual form based on where they are looking. FIG. 5 is a flow diagram 500 that illustrates various steps of a method for using eye gaze tracking to extract information in textual form from documents, according to an exemplary embodiment.

Separating fixations and saccades: A common first step in analysis related to eye gaze tracking is the separation of gaze points into fixations and saccades. Fixations are a type of eye movement where the eye is relatively fixed for a short period of time. This is when the eye collects most of its visual input. Saccades, on the other hand, are the type of eye movement between fixations, when the eye is moving rapidly and not collecting visual input. As is the case for most eye tracking experiments, here the fixations are of importance. Thus, the first step is to identify which gaze points correspond to fixations.

There are several different methods for identifying fixations, the simplest and most common of which are velocity-based methods and dispersion-based methods. These two methods are quite similar and produce indistinguishable results in an exemplary embodiment, so a velocity-based method is used, as it is the simpler and more intuitive of the two. Here, the velocity of a gaze point is calculated as the distance between that point and the previous point divided by the elapsed time between the two points. More formally, gaze point i's velocity is defined as follows:

$$v_i = \frac{\sqrt{(x_i - x_{i-1})^2 + (y_i - y_{i-1})^2}}{t_i - t_{i-1}}$$

As the definition of fixations and saccades suggests, fixations are characterized by slower point velocities where the eye pauses to ingest information, while saccades are characterized by higher point velocities where the eye moves quickly between points. Thus, gaze point i is a fixation if $v_i > V$ and a saccade otherwise, where V is a selectable threshold. The units of $v_i$ are pixels per millisecond, and the selected threshold V is set to 1. At this point, all saccades are removed from the data, and only fixations are considered.

The eye moves quickly and frequently between fixations and saccades as it moves between periods of information ingestion. It is important to not confuse the separation of fixations and saccades with identifying when the person has found the answer. Fixations and saccades are natural and subconscious rhythms in a person's eye movements and processing of information, whereas locating the information is an intentional and thoughtful process.

Adjusting for calibration error: In an exemplary embodiment, before collecting eye tracking data, the subject performs a nine point calibration. The subject is given the opportunity to retry the calibration a few times to try to improve the results, but there is always a discrepancy between where the person is actually looking and where the device believes they are looking. The calibration accuracy can also depend on features about the subject, such as their eye color and whether or not they wear glasses. An important step is to adjust for these calibration errors and attempt to uncover where the person is actually looking.

The calibration at the beginning of the experiment reveals the location of where the person's gaze was detected for each of the nine calibration points as well as the true coordinates of those points. It is assumed that the subject was looking where they were supposed to be looking and that the discrepancy between the two points is due to an inability of the eye tracker to detect where the person is actually looking. Thus, the difference between the two points in magnitude and direction is used to correct the gaze points detected by the eye gaze tracker throughout the data collection period. This is done by shifting each point based on its proximity to a particular calibration point and on the direction and magnitude of the difference between that calibration point and its corresponding gaze point from the calibration results.

More formally, for each of the 9 calibration points j, the following definition is provided for the distance in each direction between the true location of the calibration point $(x_{true,j}, y_{true,j})$ and the location of its corresponding gaze point $(x_{obs,j}, y_{obs,j})$ as $$\Delta xj = xobs, j - xtrue, j$$

and $$\Delta yj = yobs, j - ytrue, j$$

These values are used to determine how much to shift each gaze point $(x_i, y_i)$. For each gaze point in the experiment i, the distance between this gaze point and each of the true calibration points j is computed as $$d_{ij} = \sqrt{(x_i - x_{true,j})^2 + (y_i - y_{true,j})^2}$$

This value is used as a weight to determine how much an individual gaze point should be shifted based on each calibration point. For each gaze point in the experiment i, the distance to the nearest calibration point j is expressible as follows:

$$d_i^* = \min_j d_{ij}$$

and scale all other distances are scaled by this value. If the distance between a gaze point and a calibration point is above a certain threshold D, it is set to 0.

$$d_{ij} = \begin{cases} \dfrac{d_i^*}{d_{ij}} & d_{ij} < D \\ 0 & \text{else} \end{cases}$$

The threshold D is set to 1500 pixels, which is about 17 cm. This is a little over half the width of the display, which seems to be a reasonable choice because calibration points on the other half of the display likely do not impact a given point's accuracy.

Finally, using these weights, the adjusted gaze points i are defined as $$x_{adj,i} = \sum_j d_{ij} \cdot (-\Delta x_j) + x_i$$

$$y_{adj,i} = \sum_j d_{ij} \cdot (-\Delta y_j) + y_i$$

16

Estimating when the person found the answer: Recall that the goal is to determine when the person has located the answer. In an exemplary embodiment, rather than only considering the gaze point coordinates at this exact time, here all points occurring after this time are considered. In theory, once the person has found the answer, they should be fixating only on the area in which the answer is written. Thus, all gaze points occurring after the time at which the answer is found should occur near the answer.

The variation in a person's gaze is calculated over a rolling window consisting of N gaze points. Here, N is set to 50, which roughly corresponds to 0.8 seconds. Thus, from k=0, . . . , G-N where G represents the number of gaze points, we define $$(\bar{x}, \bar{y}) = \left( \frac{1}{N} \sum_{j=k}^{k+N} x_j, \frac{1}{N} \sum_{j=k}^{k+N} y_j \right)$$

and $$\text{var}_k = \frac{1}{N} \sum_{j=k}^{k+N} \sqrt{(x_j - \bar{x})^2 + (y_j - \bar{y})^2} \, .$$

Then, the rate of change in this rolling variation is calculated. This can be calculated just as the difference in subsequent variations because the time step between each is constant.

$$\Delta \text{var}_k = \text{var}_{k+1} - \text{var}_k$$

Next, the location of the point when this rate of change is the most negative is found, this corresponds to the largest drop in variation.

$$k^* = \text{argmin}_k \Delta \text{var}_k$$

This should roughly correspond to the point when the person has located the answer, as the variation in their gaze has dropped dramatically. For all $\Delta \text{var}_k$ occurring after $k^*$, there is then a search for the first k such that $$|\Delta \text{var}_k| < \text{VAR} \, \forall k = k, \ldots, k+m$$

where VAR and m are set to 5 and 60 respectfully. Essentially, it is desired to find the first time when the rate of change in the variation in the gaze is low and stays low for a period of time.

It has been observed that there is often a lag between when the person's gaze is detected inside the bounding box, which often coincides with when a determination is made that they have found the answer, and when they hit the space bar. This makes sense because it often takes some time for a person to move their hand and press the space bar, indicating that they have found the answer. Occasionally, there is a large gap between when the person's gaze is first detected within the bounding box and when the determination is made that they have found the answer, which could be explained by the person quickly glancing over the ground truth bounding box without realizing that it is the answer. Overall, however, these two values are usually quite close together, followed shortly by the time at which the space bar is hit, which indicates that the method is successful and is able to provide us with additional gaze data from before the space bar is hit.

Word box detection: In order to connect the tasks of determining where a person is looking and extracting the text, a method of identifying the location of text on the page is needed. For this, advantageous use is made of an open source OCR model which returns a bounding box of each textual unit in the document (i.e., typically one word) as well as the text which is contained in that bounding box.

Since most of the expected answers are multi-word answers, it is helpful to first merge these textual units into groups which represent a meaningful chunk of text. That way, each group of text alone represents a candidate answer. For example, the separate strings "University", "of", "Massachusetts", "Amherst" would be grouped into "University of Massachusetts Amherst." This grouping operation is performed by merging text boxes which are sufficiently close together in either the horizontal or vertical directions. In particular, boxes are merged starting from the top left corner of the document, and subsequently merging boxes to the right of the current box or below the current box if they meet the criteria described below.

The current box is defined according to its minimum and maximum value along each axis: $(x_{min1}, x_{max1}, y_{min1}, y_{max1})$. Similarly, the new box, for which consideration is given regarding merging onto the current box, is defined as $(x_{min2}, x_{max2}, y_{min2}, y_{max2})$. Here, the values increase in x in accordance with moving to the right and in y in accordance with moving downwardly. A box to the right of the current box is merged together with the current box if it is overlapping vertically and close enough horizontally (i.e., in the direction to the right) of the current box. Thus, a merge occurs if $(ymin_2 \leq ymax_1 \leq ymax_2$ OR $ymin_1 \leq ymax_2 \leq ymax_1)$ AND $(xmin_2 - xmax_1) < \in x$.

Similarly, a box below the current box is merged with the current box if $(xmin_2 \leq xmax_1 \leq xmax_2$ OR $xmin_1 \leq xmax_2 \leq xmax_1)$ AND $(ymin_2 - ymax_1) \geq \in y$.

In setting the threshold for box proximity, it is preferred to merge text which in fact does not belong in the same word chunk than to not merge text which should be grouped into a particular word chunk. A selection of $\in_x = \in_y = 30$ pixels $\approx 0.35$ centimeters is made based on this criteria.

Due to the preference to over merge, there are several cases of over capturing, where the word chunk contains more than one chunk of information if these pieces of information occur close together in the document. The chosen merging threshold depends entirely on the particular set of documents and the level of granularity of information to be extracted. Thus, it should be tuned for each application.

In order to improve computational efficiency, this process of merging bounding boxes is performed alongside the Naive Bayes Classifier described below. After successively merging bounding boxes, a calculation is made of the associated probabilities of each box, and these probabilities are then stored in a dictionary, and then the next bounding box is taken as the new starting point for the merging algorithm.

Naive Bayes Classifier: In an exemplary embodiment, it is now possible to perform the critical step of extracting the answer the subject is looking at, given the gaze data as well as the question asked. This task is explored from a probabilistic point of view, such as through the lens of a Bayesian network.

The description above has given a direct mapping between bounding boxes in the document, including the x,y coordinates of the bounding boxes, and their corresponding text. Thus, the goal can be simplified to identifying where on the document the subject is looking, in particular identifying which bounding box of text they are focusing on. Once this has been determined, the text can easily be extracted by using the bounding box to text mapping.

Formulation: In an exemplary embodiment, this task can be reformulated as finding the bounding box which maximizes the probability of that being the bounding box that the subject is focusing on given the observed gaze data and the question asked.

$$\arg\max_{Bounding\ Box} p(\text{Bounding Box} \mid \text{Gaze Data, Question})$$

Hereinafter, the abbreviation BB is used for Bounding Box. Applying Bayes Theorem to this expression, the following result is obtained:

$$\arg\max_{BB} p(BB \mid \text{Gaze Data, Question}) =$$

$$\arg\max_{BB}\left[ p(BB) \cdot \frac{p(\text{Gaze Data, Question} \mid BB)}{p(\text{Gaze Data, Question})} \right]$$

The factor in the denominator does not depend on BB and thus can be dropped. It is also assumed that p(BB) is uniform, and thus this factor is also dropped.

$$\arg\max_{BB} p(BB \mid \text{Gaze Data, Question}) = \arg\max_{BB} p(\text{Gaze Data, Question} \mid BB)$$

Applying the conditional independence assumption of Naive Bayes yields the following:

$$\arg\max_{BB} p(BB \mid \text{Gaze Data, Question}) =$$

$$\arg\max_{BB}[p(\text{Gaze Data} \mid BB) \cdot p(\text{Question} \mid BB)]$$

The gaze data are separated into x and y coordinates and an assumption of independence between x and y as well as between each individual gaze points is made. To avoid numerical underflow, the logarithm of both sides is used. The question factor is scaled by some constant $\lambda$, which is chosen via hyperparameter tuning to be 400.

$$\arg\max_{BB} p(BB \mid \text{Gaze Data, Question}) =$$

$$\arg\max_{BB}\left[ \log\left( \sum_{i=1}^{n}[p(x_i \mid BB) + p(y_i \mid BB)] + \lambda \cdot p(\text{Question} \mid BB) \right) \right]$$

Estimating gaze data probability: Here, the goal is to determine $p(x_i \mid BB)$ and $p(y_i \mid BB)$ which represent the probability of observing gaze points at $(x_i, y_i)$ given that the person is looking at a certain bounding box. It is important to note that probabilities are considered with respect to each axis separately.

For each bounding box, Gaussian distributions are constructed over each axis with parameters determined by hyperparameter tuning. In particular, both Gaussians are centered at 0 with standard deviations of 600 and 200 pixels for the x and y directions respectively. These values make sense because the bounding boxes tend to be wider in the x direction than in the y direction. The document is then divided into a grid of half centimeter length boxes. For each grid unit that contains gaze points and for each bounding box, a calculation is made of the probability of observing gaze points in that grid given that the person is looking at that bounding box across both dimensions based on the Gaussian distributions. The desired probabilities $p(x_i|BB)$ and $p(y_i|BB)$ are thus determined by which grid $x_i$ and $y_i$ occur in and their associated probabilities.

The probabilities $p(x_i|BB)$ and $p(y_i|BB)$ are constructed in the same way, so the following is a description of the formulation of $p(x_i|BB)$; however the same formulation is used along the y axis as well. First, the center of the bounding box i in the x direction is defined as $$BB_{i,center} = \frac{1}{2} \cdot (BB_{i,x,min} + BB_{i,x,max})$$

and the center of the document grid unit j in the x direction is given by $$grid_{j,center} = \frac{1}{2} \cdot (grid_{j,x,min} + grid_{j,x,max})$$

The z statistic is defined in terms of the difference between these two values. Thus, $$z_{x_i} = \frac{|grid_{center} - BB_{center}|}{\sigma_x}$$

where $\sigma_x$ is the standard deviation parameter described above. Then, the cumulative distribution function of the normal distribution function may be used to estimate the probability of observing this statistic. This value is subtracted from 1 because strictly positive values are being used, and it is desired that the probability to decrease as the value of $z_x$, increases.

$$p(x_i | BB) = 1 - \Phi(z_{xi})$$

As described above, $p(y_i|BB$ is defined in an identical way, but the parameter $\sigma_y$ corresponds to the standard deviation in the y direction. This makes sense, as the bounding boxes in the y dimension are narrower than in the x direction.

Estimating question probability: The goal here is to estimate $p(Question|BB)$, which represents the probability that some text represents an answer to the question given that the person is looking at a certain bounding box. The text here is the text corresponding to the particular bounding box.

Leverage is used with respect to the fact that there is a fixed set of questions and each is associated with a certain text type for its response. This association is based on knowledge about the question. For example, one would expect email addresses to contain "@" and phone numbers to contain digits. This allows the use of regular expressions as well as named entity recognition (NER) to express the desired probability. The probabilities are constructed based on knowledge.

The following is an example of the defined probabilities: For the question "What is the candidate's email address?" the following rules are applicable:

| Rule | Probability |
| --- | --- |
| Matches a regular expression for email addresses | 1.0 |
| Contains an "@" | 0.6 |
| Contain no letters | 0.01 |
| Meets none of the above criteria | 0.1 |

Postprocessing: In an exemplary embodiment, the final step involves postprocessing to try to remove the effect of overcapturing described above. Use is again made of knowledge about the expected text type, this time filtering any information in the text corresponding to the selected bounding box which does not fit the expected type. Regular expressions and named entity recognition are again used.

In particular, for emails, a search is conducted for a match with a regular expression for email addresses, and only the matching substring is kept if one is found. If none is found, only the word in the string containing the '@' is kept. Similarly, pattern matching for phone numbers is performed. If no match is found and if there are at least 9 digits, only the digits are kept. For employers, a search is performed for a match with one of the companies on a list, and if a match is found, only this substring is kept. If there is no match, NER is employed to search for an organization, and if one is found, only this substring is kept. Similarly, for names, NER is employed to search for a person, keeping only this substring if one is found. If none is found, a search is performed for words where the first letter is capitalized, and only these words are kept. For schools and universities, no postprocessing is performed, because it has been found that the use of patterns or NER often does more harm than good, sometimes removing the end or beginning of university names.

Accordingly, with this technology, an optimized process for implementing methods and systems for using eye gaze tracking to extract information in textual form from documents is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for extracting textual information from a document, the method being implemented by at least one processor, the method comprising:

receiving, by the at least one processor, an image that corresponds to a document;

receiving, by the at least one processor from an eye-tracking sensor, a sequence of measurements of eye-gaze positions that correspond to a reading of the document by a human, wherein the eye-gaze positions are detected by emitting an infrared light and detecting a reflection off a cornea of the human;

identifying, by the at least one processor, at least one fixation and at least one saccade based on the sequence of measurements, wherein the at least one fixation is identified by calculating a distance between an eye-gaze position and a previous eye-gaze position divided by elapsed time between the eye-gaze position and the previous eye-gaze position;

determining, by the at least one processor based on the received sequence of measurements and the identified at least one fixation and at least one saccade, at least one region of the document that is being read by the human, wherein the determining includes:

drawing, for each textual unit included in the document, a respective box that surrounds a corresponding textual unit, in order to generate a plurality of boxes;

determining, based on a predetermined set of criteria, whether at least a first box from among the plurality of boxes is to be merged with at least one additional box from among the plurality of boxes; and merging at least a subset of the plurality of boxes into a plurality of box groups based on a result of the determining with respect to the plurality of boxes, wherein the at least one region of the document corresponding to one or more of the plurality of box groups, and wherein the subset of the plurality of boxes are selected for the merging based on a number of eye-gaze points included in each box included in the subset; and extracting, by the at least one processor, the textual information that corresponds to the determined at least one region.

2. The method of claim 1, further comprising:

during the receiving of the sequence of measurements, collecting a predetermined number of calibration measurements that correspond to predetermined locations within the document, wherein the determining of the at least one region that is being read by the human comprises adjusting the received sequence of measurements based on the collected calibration measurements.

3. The method of claim 1, wherein the at least one region includes a first region that corresponds to an answer for which the human searches while reading the document; and the method further comprises using the received sequence of measurements to estimate a time at which the answer is found by the human.

4. The method of claim 1, wherein the determining of the at least one region comprises selecting at least one box group from among the plurality of box groups as corresponding to the at least one region.

5. The method of claim 4, wherein the determining of the at least one region comprises calculating a probability that a first subset of the sequence of measurements corresponds to the at least one box group.

6. The method of claim 1, further comprising calculating a probability that a first question from among a predetermined plurality of questions corresponds to the extracted textual information.

7. A computing apparatus for extracting textual information from a document, the computing apparatus comprising:

a processor;

a memory; and a communication interface coupled to each of the processor and the memory, wherein the processor is configured to:

receive, via the communication interface, an image that corresponds to a document;

receive, via the communication interface from an eye-tracking sensor, a sequence of measurements of eye-gaze positions that correspond to a reading of the document by a human, wherein the eye-gaze positions are detected by emitting an infrared light and detecting a reflection off a cornea of the human;

identify at least one fixation and at least one saccade based on the sequence of measurements, wherein the at least one fixation is identified by calculating a distance between an eye-gaze position and a previous eye-gaze position divided by elapsed time between the eye-gaze position and the previous eye-gaze position;

determine, based on the received sequence of measurements and the identified at least one fixation and at least one saccade, at least one region of the document that is being read by the human, wherein the at least one region of the document is determined by:

drawing, for each textual unit included in the document, a respective box that surrounds a corresponding textual unit, in order to generate a plurality of boxes;

determining, based on a predetermined set of criteria, whether at least a first box from among the plurality of boxes is to be merged with at least one additional box from among the plurality of boxes; and merging at least a subset of the plurality of boxes into a plurality of box groups based on a result of the determining with respect to the plurality of boxes, wherein the at least one region of the document corresponding to one or more of the plurality of box groups, and wherein the subset of the plurality of boxes are selected for the merging based on a number of eye-gaze points included in each box included in the subset; and extract the textual information that corresponds to the determined at least one region.

8. The computing apparatus of claim 7, wherein the processor is further configured to:

during the reception of the sequence of measurements, collect a predetermined number of calibration measurements that correspond to predetermined locations within the document; and while performing the determination of the at least one region that is being read by the human, adjust the received sequence of measurements based on the collected calibration measurements.

9. The computing apparatus of claim 7, wherein the at least one region includes a first region that corresponds to an answer for which the human searches while reading the document; and the processor is further configured to use the received sequence of measurements to estimate a time at which the answer is found by the human.

10. The computing apparatus of claim 7, wherein the processor is further configured to select at least one box group from among the plurality of box groups as corresponding to the at least one region.

11. The computing apparatus of claim 10, wherein the processor is further configured to calculate a probability that a first subset of the sequence of measurements corresponds to the at least one box group.

12. The computing apparatus of claim 7, wherein the processor is further configured to calculate a probability that a first question from among a predetermined plurality of questions corresponds to the extracted textual information.

13. A non-transitory computer readable storage medium storing instructions for extracting textual information from a document, the storage medium comprising executable code which, when executed by a processor, causes the processor to:

receive an image that corresponds to a document;

receive, from an eye-tracking sensor, a sequence of measurements of eye-gaze positions that correspond to a reading of the document by a human, wherein the eye-gaze positions are detected by emitting an infrared light and detecting a reflection off a cornea of the human;

identify at least one fixation and at least one saccade based on the sequence of measurements, wherein the at least one fixation is identified by calculating a distance between an eye-gaze position and a previous eye-gaze position divided by elapsed time between the eye-gaze position and the previous eye-gaze position;

determine, based on the received sequence of measurements and the identified at least one fixation and at least one saccade, at least one region of the document that is being read by the human, wherein the at least one region of the document is determined by:

drawing, for each textual unit included in the document, a respective box that surrounds the corresponding textual unit, in order to generate a plurality of boxes;

determining, based on a predetermined set of criteria, whether at least a first box from among the plurality of boxes is to be merged with at least one additional box from among the plurality of boxes; and merging at least a subset of the plurality of boxes into a plurality of box groups based on a result of the determining with respect to the plurality of boxes, wherein the at least one region of the document corresponding to one or more of the plurality of box groups, and wherein the subset of the plurality of boxes are selected for the merging based on a number of eye-gaze points included in each box included in the subset; and extract the textual information that corresponds to the determined at least one region.

* * * * *